United States Patent [19]

Shinsen

[11] Patent Number: 5,577,795
[45] Date of Patent: Nov. 26, 1996

[54] OPERATOR CAB DOOR OF CONSTRUCTION MACHINE

[75] Inventor: Mitsuhisa Shinsen, Komatsu, Japan

[73] Assignee: Kabushiki Kaisha Komatsu Seisakusho, Tokyo, Japan

[21] Appl. No.: 374,673

[22] PCT Filed: Jul. 16, 1993

[86] PCT No.: PCT/JP93/00989

§ 371 Date: Apr. 28, 1995

§ 102(e) Date: Apr. 28, 1995

[87] PCT Pub. No.: WO94/02689

PCT Pub. Date: Feb. 3, 1994

[30] Foreign Application Priority Data

Jul. 21, 1992 [JP] Japan ................... 4-056852

[51] Int. Cl.$^6$ ................................... B60J 5/06
[52] U.S. Cl. .................. 296/190; 49/41; 49/449; 180/89.12; 292/DIG. 46; 296/146.9; 296/207
[58] Field of Search .................... 296/190, 202, 296/146.1, 155, 147, 146.9, 207; 180/89.12; 49/40, 41, 209, 213, 214, 449, 451; 292/DIG. 46, 340

[56] References Cited

U.S. PATENT DOCUMENTS

| 1,919,387 | 7/1933 | Stringer | 296/155 |
|---|---|---|---|
| 4,869,544 | 9/1989 | Anwyll et al. | 296/155 |
| 4,991,905 | 2/1991 | Watanabe et al. | 296/155 |

FOREIGN PATENT DOCUMENTS

| 58-95473 | 6/1983 | Japan . |
|---|---|---|
| 63-143665 | 9/1988 | Japan . |
| 4-37657 | 3/1992 | Japan . |
| 4-69314 | 6/1992 | Japan . |
| 5-38057 | 5/1993 | Japan . |

*Primary Examiner*—David M. Mitchell
*Assistant Examiner*—Kia M. Robinson
*Attorney, Agent, or Firm*—Richards, Medlock & Andrews

[57] ABSTRACT

A door opening of an operator cab for a construction machine is enlarged so that protrusion of the door beyond a turning radius can be avoided when the door is fully opened and so that the operator cab can have a wide indoor space. Therefore, a side wall (2a) of the operator cab (2) at an opposite side to a boom of a working-machine installed on a swivel base (1) is formed to have an outer convex surface, including the door; rails (4, 5 and 6) are provided on the side wall (2a) of the operator cab (2); the door (3) is provided with rollers (7, 8 and 9) which are always engaged with the rails to slide the door for easy opening and closing operation, and the position of the door (3) when the door is locked fully open is set to be within a range of turning radius (R) of the swivel base (1) along the outer surface of side wall (2a) of the operator cab (2).

23 Claims, 6 Drawing Sheets

OPERATOR CAB DOOR OF CONSTRUCTION MACHINE

FIELD OF THE INVENTION

The present invention relates to an operator cab of a construction machine and, more particularly, an operator cab of a construction machine such as a hydraulic excavating machine provided with a swivel body.

RELATED BACKGROUND ART

Figure 9:
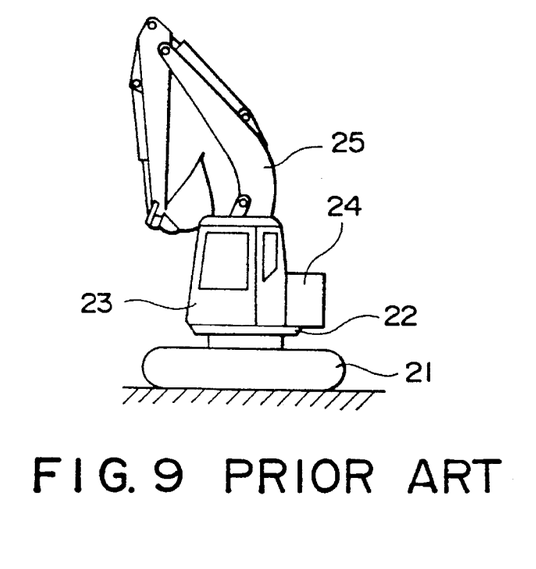
FIG. 9 is a side view of a conventional hydraulic excavating machine.
Figure 10:
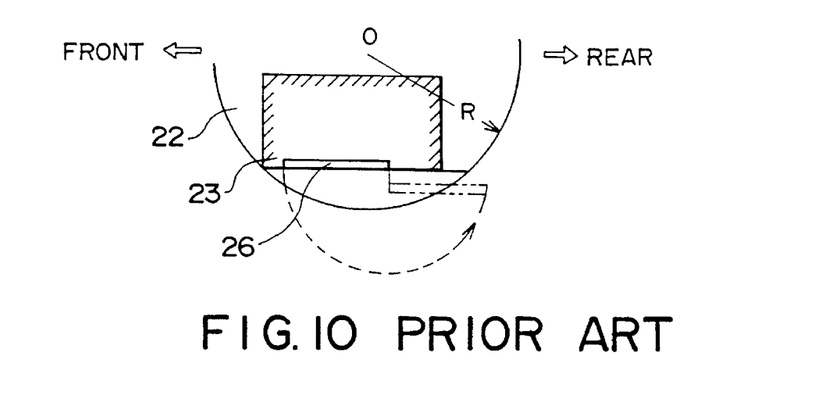
FIG. 10 is an illustrative plan view of a swivel type door of a conventional operator cab.
Figure 11:
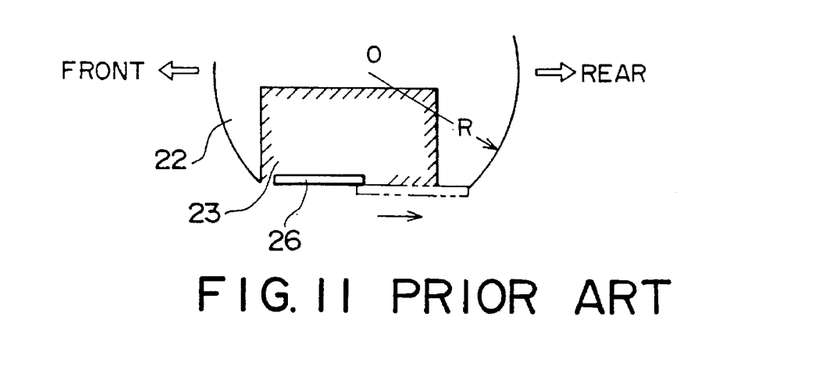
FIG. 11 is an illustrative plan view of a slide type door of a conventional operator cab.

A side view of a conventional hydraulic excavating machine, having a swivel base 22 on a crawler 21, is shown in FIG. 9. This swivel base 22 is equipped with an operator cab 23, an engine compartment 24 and a collapsible working machine 25. The operator cab 23 on such hydraulic excavating machine is installed off-center with respect to the center O of the swivel base 22, as shown in FIGS. 10 and 11. A hinge type door 26 of the operator cab 23, for an operator to access the inside of the operator cab 23, is opened by pivoting the door 26 to a fully-opened position as shown with a 2-dotted broken line in FIG. 10. A slide type door 26 is opened by sliding it to a fully-opened position as shown with the 2-dotted broken line in FIG. 11.

However, if the opening for the hinge type door is large-sized, it presents the problem that the door protrudes beyond the turning radius R of the upper swivel body when the door is kept open and fixed, and can therefore be damaged due to collision or bumping with other external objects during a swiveling operation.

In the case of the slide type door, the rails and rollers employed to slide the door occupy space within the operator cab, and therefore the internal space of the operator cab is reduced. As the construction machine is generally operated with its door kept open in summer, there is a problem in that it is difficult to fix the door without any play when it is kept open, since there is inevitably some play in the mechanism of such slide type door.

SUMMARY OF THE INVENTION

An object of the present invention made to solve the above-described problems is to provide an operator cab of a construction machine capable of preventing protrusion of the door beyond the turning radius when the door is to be kept open, by appropriately determining the size of the door opening, and simultaneously securing the door without play when the door is kept either fully opened or closed, while maintaining a larger indoor space.

According to the present invention, an outer side surface of a side wall of the operator cab, located at an opposite side to a boom of a working machine mounted on a swivel base, is formed to be convex, including the door; rails are provided inside this side wall of the operator cab; and the door is provided with rollers, which are always engaged with the rails, to slide the door for freely opening and closing the door; and the position of the door, when it is locked open, is set to be along the outer surface of the side wall of the operator cab and within the turning radius of the swivel base. Specifically, an upper rail is installed at an internal upper part of the outer side wall of the operator cab, a lower rail at an internal lower part of the outer side wall, and a center rail at an outside center of the outer side wall, respectively, and the door is provided with the upper roller, lower roller, and center roller which are always engaged with these rails to slide the door for freely opening and closing the door.

Male and female strikers, which engage with each other when the door is fully opened or closed, are provided between the outer side wall of the operator cab and the door.

According to the construction described above, the door can be opened and closed with the rollers which move on the rails since the rollers are engaged with the rails provided inside the operator cab, and any unexpected contact with external obstructive objects can be avoided even during swiveling operation since the position of the fully opened door remains within the turning radius of the swivel base. The male and female strikers ensure firm fixing of the door without play, even when it is fully opened or closed, because the strikers engage with each other in either of these positions of the door.

BEST MODE FOR CARRYING OUT THE INVENTION

Figure 1:
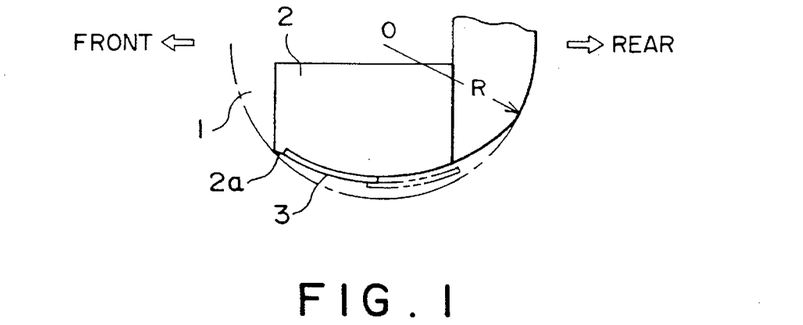
FIG. 1 is an illustrative plan view of a first embodiment where the outer surface of a side wall of the operator cab is arc-shaped in accordance with a first aspect of the present invention.
Figure 2A:
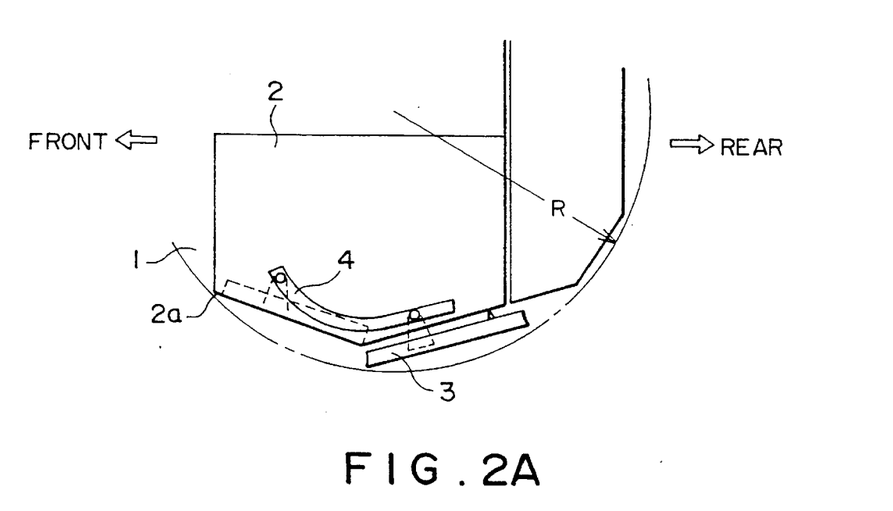
FIG. 2A is an illustrative plan view of a second embodiment where the outer side surface of a side wall of the operator cab is pentagonal.
Figure 2B:
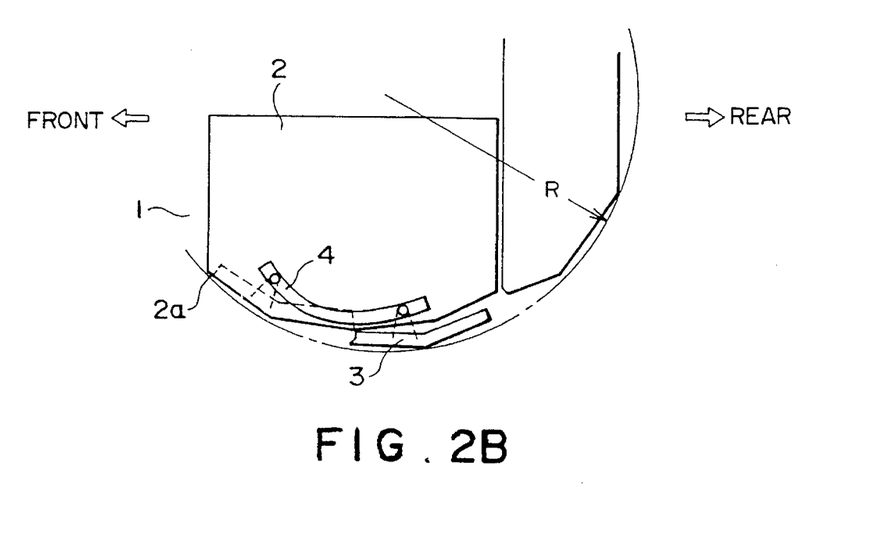
FIG. 2B is an illustrative plan view of a third embodiment where the outer side surface of a side wall of the operator cab is heptagonal.

Embodiments related to the present invention are described below in detail, referring to FIGS. 1 to 8. As the shapes of the outer surface of a side wall shown in FIGS. 2A and 2B are a pentagon and a heptagon, similar to the arc of the outer side wall shown in FIG. 1, the same reference numerals are used.

Figure 3:
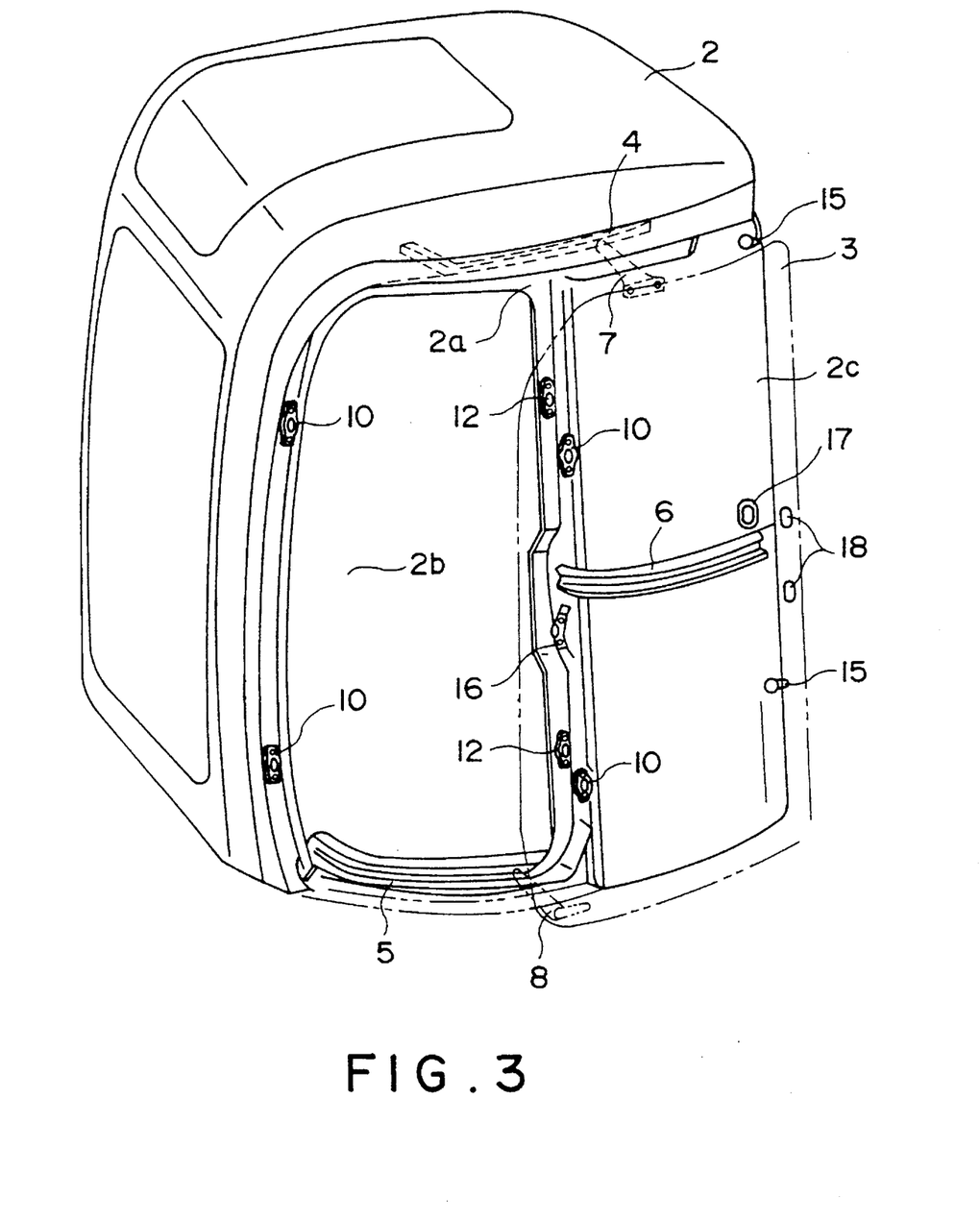
FIG. 3 is an illustrative perspective view of the operator cab shown in FIG. 1.

According to a first aspect of the invention, an outer surface of a side wall 2a, at a side opposite to a boom of a working machine mounted on a swivel base 1, is formed in a convexed arc, pentagonal or heptagonal shape, including the door 3. An upper rail 4 is provided at an inside upper part of the outer side wall 2a of the operator cab 2 as shown in FIG. 3, a lower rail 5 is provided at an inside lower part of the outer side wall 2a, and a center rail 6 is provided at an outside center part of the outer side wall 2a. The door 3 is provided with an upper roller 7, a lower roller 8, and a center roller 9, which are always engaged with these rails 4, 5 and 6, to slide the door 3 for freely opening and closing the door 3. The position of the door 3 when it is locked open is set to be along the outer surface of side wall 2a of the operator cab 2 and within the turning radius R of the swivel base 1.

According to a second aspect of the invention, the outer surface of side wall 2a, at a side opposite to a boom of a working machine mounted on the swivel base 1, is formed in a convexed arc; a door 3, which physically matches the outer surface of side wall 2a, is provided to be openable by sliding the door 3; and a plurality of male and female strikers 10, 11, 12, 13, 14 and 15, which engage with each other when the door 3 is opened or closed, are provided between the door 3 and the outer side wall 2a.

A vertically elongated opening 2b, having a larger width than conventional, is formed in the front portion of the outer side wall 2a of the operator cab 2 for installing the door 3; and a side wall 2c is formed as the rear portion of the outer side wall 2a. An upper rail 4 of a specified length, having a channel type cross-section and being curved in the longitudinal direction, is provided at an inside upper part of the outer side wall 2a near the ceiling of the operator cab 2 at the front end part in the horizontal direction of the operator cab 2. A similar lower rail 5, which is provided at an inside lower part of the side wall, is located at a position forward of the upper rail 4. A channel type center rail 6 is provided by a central part of the side wall 2c so as to extend along a horizontal direction.

Figures 4A, 4B, 4C:
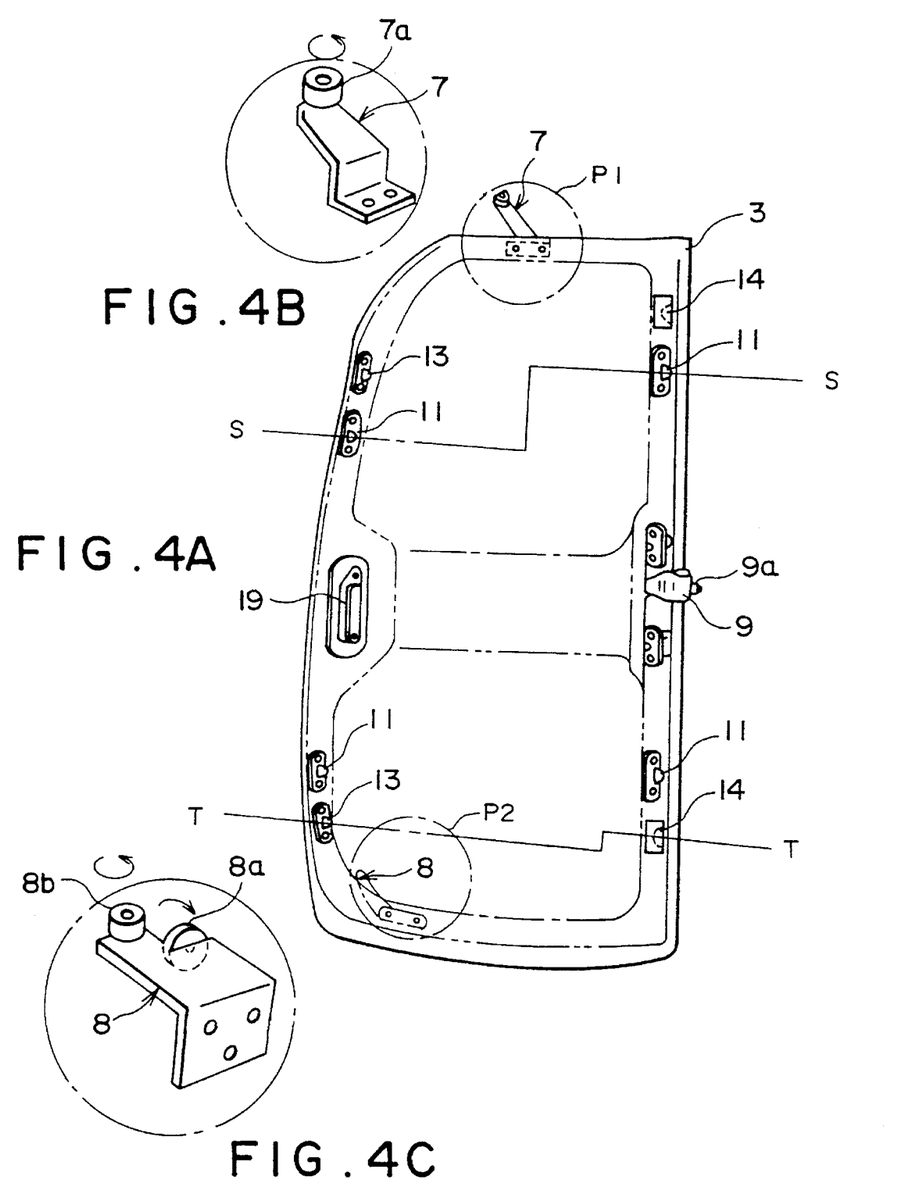
FIG. 4A is an illustrative perspective view of the door shown in FIG. 1.
FIGS. 4B and 4C are expanded illustrations of parts of the door of FIG. 4A.
Figure 6:
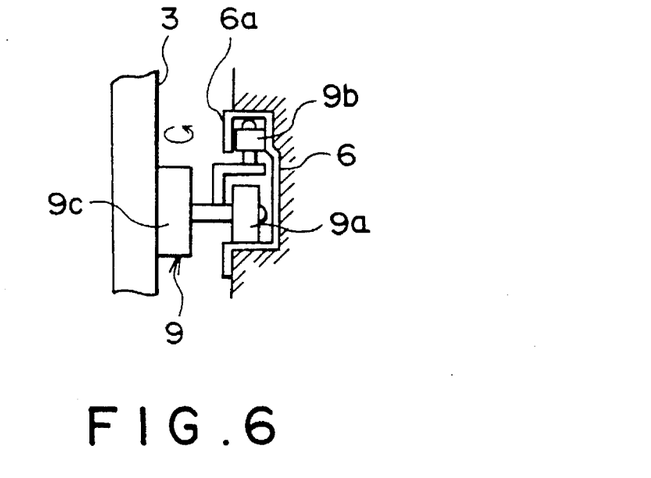
FIG. 6 is an illustration of engagement of the center rail and the center roller shown in FIG. 3.

The door 3 is formed to be larger than the door opening 2b, as shown in FIG. 4A. The upper roller 7, having at its distal end a rolling roller 7a which engages with the channel of the upper rail 4, is mounted on the inside of the horizontal front end portion of the upper part of door 3. The lower roller 8, having a rolling roller 8a and a guide roller 8b, which respectively engage with the channel of the lower rail 5, is mounted on the inside of the front end portion of the lower part of door 3. The center roller 9, having the rolling roller 9a and the guide roller 9b which engage with the channel of the center rail 6 as shown in FIG. 6, is provided inside of the rear end portion of the central part of door 3. Accordingly, the door 3 is installed to the operator cab 2 so that rollers 7a, 8a, 8b, 9a and 9b are respectively engaged with the rails 4, 5 and 6 as shown with the 2-dotted broken line in FIG. 3. The cross-section of the upper rail 4 is partly cut away at the lower surface of its profile, and the cross-sections of the center rail 6 and the lower rail 8 are partly cut away at the sides of their profiles. These rails are arc-shaped to substantially contact the inside surface of the side wall 2a of the operator cab 2 and engage with the guide rollers 8b and 9b and the rolling rollers 7a, 8a and 9a.

A striker 16, for locking the door 3 in the closed position, is provided at an intermediate portion in the direction of height on the external side of the front part of the side wall 2c of the operator cab 2, as shown in FIG. 3, and male and female strikers 10, 10 are provided above and below the striker 16. A striker 17, for locking the door 3 in the fully opened position, is provided at the rear portion of the side wall 2c. Female strikers 12, 12 are provided above and below the female strikers 10, 10. On the other hand, at least one group of female strikers 10, 10 and 12, 12 are respectively provided at the front part and the rear part of the peripheral edge of the door opening 2b. The strikers 10, 11, 12, 13, 14 and 15 can be either male or female if they are paired as a set of male and female types. 18 denotes a door lock and 19 denotes a door handle.

The operation of the operator cab 2 is described below.

Figure 5:
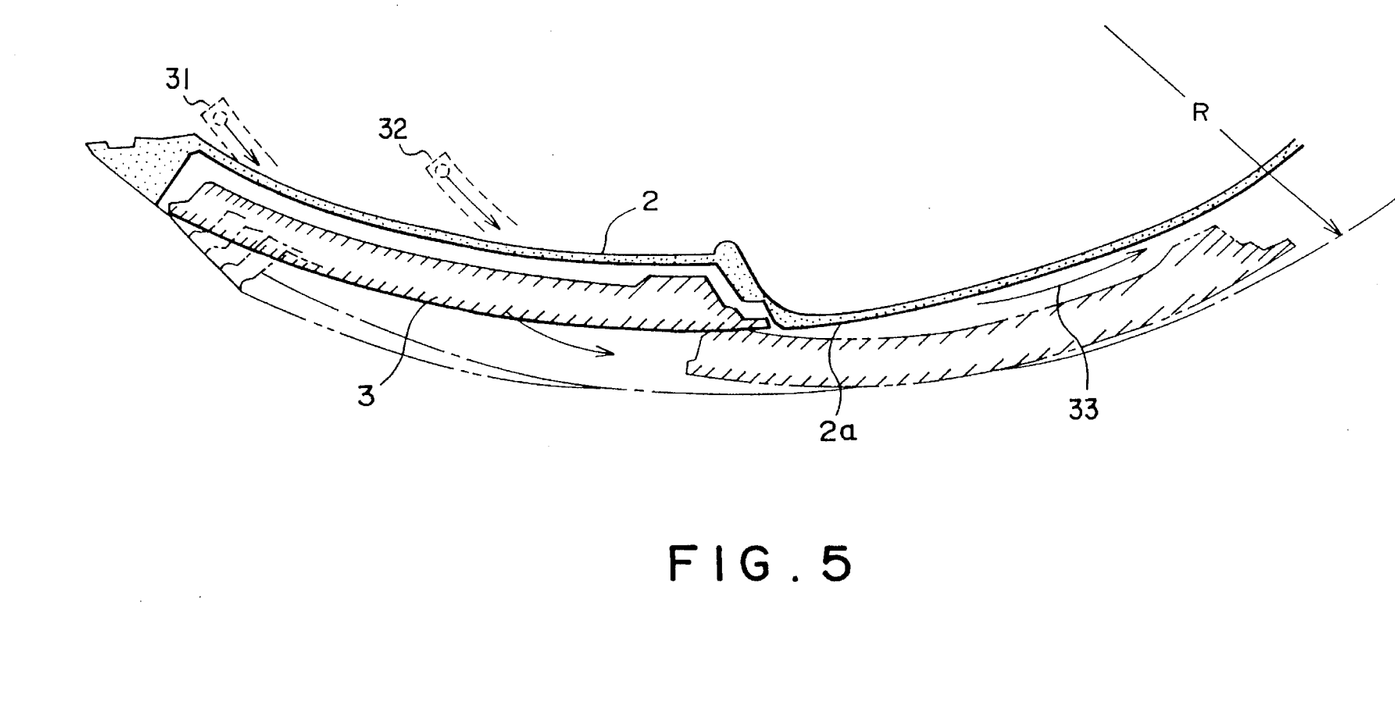
FIG. 5 is an illustrative plan view of the locus of the door shown in FIG. 3 from the closed position to the fully opened position.

The door 3 of the operator cab 2 can be opened and closed along a locus as shown in FIG. 5 by operating the door handle 19. In other words, when closing the door 3, the front end of the door 3 is gradually aligned with the outer side wall 2a of the operator cab 2 while being moved in parallel to the outer side wall 2a. Accordingly, when the door 3 is fully opened, the outer arc-shaped surface of the side wall 2a of the operator cab 2 is overlapped by the door 3, and the door 3 is held within the turning radius R. As the upper roller 7 engages with the upper rail 4, the lower roller 8 engages with the lower rail 5, and the center roller 9 engages with the center rail 6, such movement of the door 3 is controlled in a horizontal direction.

The details of constructions of engagement of the rails 4, 5 and 6 with the rollers 7, 8 and 9 are described using the center rail 6 and the center roller 9 as examples. As shown in FIG. 6, the center rail 6 is provided with a guide 6a at one end, and the center roller 9 has the guide roller 9b and the rolling roller 9a, which bears a load during movement of the door 3. The shaft 9c of the center roller 9 is provided with a swinging function to smooth movement of the center roller 9 in the center rail 6. Similarly, in case of the lower roller 8, the rolling roller 8a bears the load during movement of the door 3 and the guide roller 8b guides movement of the lower roller 8 in the lower rail 5.

Figure 7:
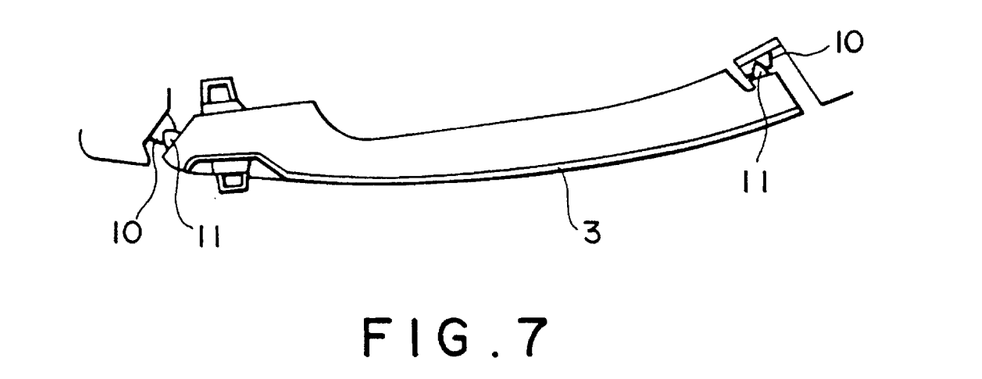
FIG. 7 is a cross-sectional view along line S—S in FIG. 4A, showing engagement of male and female strikers when the door is closed in accordance with a second aspect of the invention.
Figure 8:
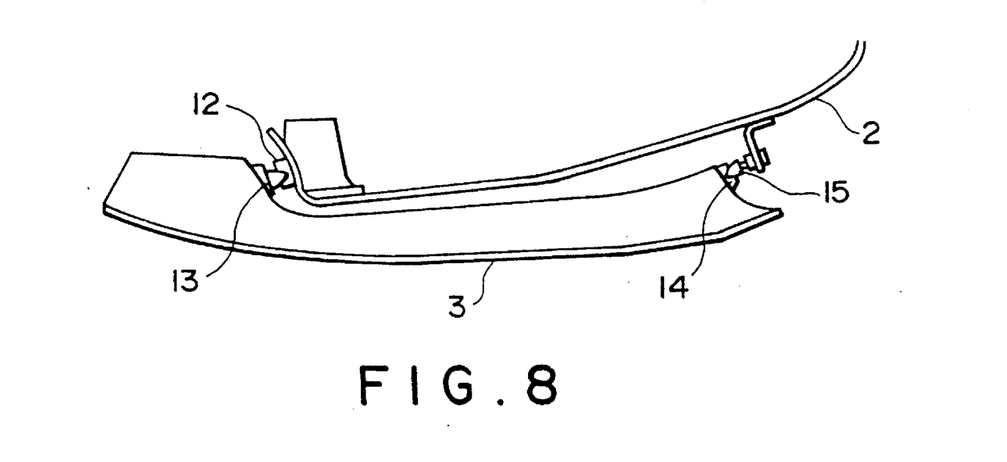
FIG. 8 is a cross-sectional view along line T—T in FIG. 4A, showing engagement of male and female strikers according to the second aspect when the door is fully opened.

When the door 3 is closed, a front pair of male and female strikers 10, 11 engage each other and a rear pair of male and female strikers 10, 11 engage each other, as shown in FIG. 7, showing a cross-sectional view along line S—S in FIG. 4A. When the door 3 is fully opened, front female and male strikers 12, 13 engage each other and rear female and male strikers 14, 15 engage each other, as shown in FIG. 8 which is a cross-sectional view along line T—T in FIG. 4A, and the door is firmly fixed without play.

Having described the operator cab 2 with a side wall 2a having an arc-shaped outer surface, the description in the case that the shape of the outer surface of the side wall 2a is n-th polyhedral, as shown in FIGS. 2A and 2B, clearly conforms to the above description.

INDUSTRIAL APPLICABILITY OF THE INVENTION

The operator cab for a construction machine according to the present invention is useful as a highly durable operator cab for construction machines, and is adapted to facilitate operator access to the operator cab, to prevent interference with the door by obstructions when the door is opened, and to facilitate fixing of the door.

What is claimed is:

1. An operator cab suitable for use on a construction machine, said cab comprising:

an outer side wall having a doorway formed therein,
    a door,
    a plurality of rails provided in said outer side wall,
    a plurality of rollers mounted to said door, each of said plurality of rollers always being in engagement with a respective one of said plurality of rails to support said door as said door is slid between a closed position, in which said doorway is closed, and a fully opened position, in which said doorway is open, a plurality of pairs of strikers, each of said pairs of strikers comprising a male striker and a female striker, one of the strikers of each pair being mounted to said door and the other striker of the respective pair being mounted to said outer side wall such that at least one pair of strikers are engaged with each other when said door is in its closed position and at least one pair of strikers are engaged with each other when said door is in its fully opened position, wherein at least one of said plurality of pairs of strikers is mounted for engaging each other at a front edge portion of the door when the door is fully opened, and at least one other pair of said plurality of pairs of strikers is mounted for engaging each other at a rear edge portion of the door when the door is fully opened.

2. An operator cab in accordance with claim 1, wherein the outer surface of said outer side wall, including the door, is arc shaped.

3. An operator cab in accordance with claim 1, wherein the outer surface of said outer side wall, including the door, is formed as a n-th polyhedral.

4. An operator cab in accordance with claim 1, wherein each of said rails has a channel cross-section and is curved in the longitudinal direction.

5. An operator cab in accordance with claim 1, wherein said plurality of rails comprises an upper rail provided at an upper part of said outer side wall, a lower rail provided at a lower part of said outer side wall, and a center rail provided at a central part of said outer side wall.

6. An operator cab in accordance with claim 5, wherein each of said rails has a channel cross-section and wherein each of said upper rail and said lower rail is curved in the longitudinal direction.

7. An operator cab in accordance with claim 5, wherein the roller which engages said upper rail is mounted at an upper portion of the door which is close to said doorway when said door is in its fully opened position, wherein the roller which engages said lower rail is mounted at a lower portion of the door which is close to said doorway when said door is in its fully opened position, and wherein the roller which engages said center rail is mounted at a central side edge portion of the door which is remote from the doorway when said door is in its fully opened position.

8. An operator cab in accordance with claim 7, further comprising a locking striker, provided at a vertically intermediate portion of the door which is remote from said doorway when the door is in its fully opened position, for locking the door when the door is in its fully opened position, and wherein at least one of said plurality of pairs of strikers is mounted above said locking striker and at least one of said plurality of pairs of strikers is mounted below said locking striker for engaging with each other when the door is in its fully opened position.

9. An operator cab in accordance with claim 7, further comprising a first locking striker, provided at a vertically intermediate portion of the door which is close to said doorway when the door is in its fully opened position, for locking the door when the door is in its closed position, and wherein at least one of said plurality of pairs of strikers is mounted above said first locking striker and at least one of said plurality of pairs of strikers is mounted below said first locking striker for engaging with each other when the door is in its closed position.

10. An operator cab in accordance with claim 9, further comprising a second locking striker, provided at a vertically intermediate portion of the door which is remote from said doorway when the door is in its fully opened position, for locking the door when the door is in its fully opened position, and wherein at least one of said plurality of pairs of strikers is mounted above said second locking striker and at least one of said plurality of pairs of strikers is mounted below said second locking striker for engaging with each other when the door is in its fully opened position.

11. An operator cab in accordance with claim 1, wherein the operator cab is suitable for use on a construction machine equipped with a swivel base on which a working machine and the operator cab are installed, said side wall being an opposite side to a boom of said working machine with the outer surface of said side wall having a convex shape so that said door in its fully opened position is external of said operator cab and within a turning radius of the swivel base.

12. An operator cab in accordance with claim 1, wherein at least one of said plurality of pairs of strikers is mounted for engaging each other at a front edge portion of the door when the door is closed, and at least one other pair of said plurality of pairs of strikers is mounted for engaging each other at a rear edge portion of the door when the door is closed.

13. An operator cab suitable for use on a construction machine, said cab comprising:

an outer side wall having a doorway formed therein, a door, a plurality of rails provided in said outer side wall, a plurality of rollers mounted to said door, each of said plurality of rollers always being in engagement with a respective one of said plurality of rails to support said door as said door is slid between a closed position, in which said doorway is closed, and a fully opened position, in which said doorway is open, a plurality of pairs of strikers, each of said pairs of strikers comprising a male striker and a female striker, one of the strikers of each pair being mounted to said door and the other striker of the respective pair being mounted to said outer side wall such that at least one pair of strikers are engaged with each other when said door is in its closed position and at least one pair of strikers are engaged with each other when said door is in its fully opened position and, a locking striker, provided at a vertically intermediate portion of the door which is remote from said doorway when the door is in its fully opened position, for locking the door when the door is in its fully opened position, and wherein at least one of said plurality of pairs of strikers is mounted above said locking striker and at least one of said plurality of pairs of strikers is mounted below said locking striker for engaging with each other when the door is in its fully opened position.

14. An operator cab in accordance with claim 13, wherein the outer surface of said outer side wall, including the door, is arc shaped.

15. An operator cab in accordance with claim 13, wherein the outer surface of said outer side wall, including the door, is formed as a n-th polyhedral.

16. An operator cab in accordance with claim 13, wherein each of said rails has a channel cross-section and is curved in the longitudinal direction.

17. An operator cab in accordance with claim 13, wherein said plurality of rails comprises an upper rail provided at an upper part of said outer side wall, a lower rail provided at a lower part of said outer side wall, and a center rail provided at a central part of said outer side wall.

18. An operator cab in accordance with claim 17, wherein each of said rails has a channel cross-section and wherein each of said upper rail and said lower rail is curved in the longitudinal direction.

19. An operator cab in accordance with claim 17, wherein the roller which engages said upper rail is mounted at an upper portion of the door which is close to said doorway when said door is in its fully opened position, wherein the roller which engages said lower rail is mounted at a lower portion of the door which is close to said doorway when said door is in its fully opened position, and wherein the roller which engages said center rail is mounted at a central side edge portion of the door which is remote from the doorway when said door is in its fully opened position.

20. An operator cab suitable for use on a construction machine, said cab comprising:

an outer side wall having a doorway formed therein, a door, a plurality of rails provided in said outer side wall, a plurality of rollers mounted to said door, each of said plurality of rollers always being in engagement with a respective one of said plurality of rails to support said door as said door is slid between a closed position, in which said doorway is closed, and a fully opened position, in which said doorway is open, a plurality of pairs of strikers, each of said pairs of strikers comprising a male striker and a female striker, one of the strikers of each pair being mounted to said door and the other striker of the respective pair being mounted to said outer side wall such that at least one pair of strikers are engaged with each other when said door is in its closed position and at least one pair of strikers are engaged with each other when said door is in its fully opened position, a first locking striker, provided at a vertically intermediate portion of the door which is close to said doorway when the door is in its fully opened position, for locking the door when the door is in its closed position, and wherein at least one of said plurality of pairs of strikers is mounted above said first locking striker and at least one of said plurality of pairs of strikers is mounted below said first locking striker for engaging with each other when the door is in its closed position, and a second locking striker, provided at a vertically intermediate portion of the door which is remote from said doorway when the door is in its fully opened position, for locking the door when the door is in its fully opened position, and wherein at least one of said plurality of pairs of strikers is mounted above said second locking striker and at least one of said plurality of pairs of strikers is mounted below said second locking striker for engaging with each other when the door is in its fully opened position.

21. An operator cab in accordance with claim 20, wherein at least one of said plurality of pairs of strikers is mounted for engaging each other at a front edge portion of the door when the door is closed, and at least one other pair of said plurality of pairs of strikers is mounted for engaging each other at a rear edge portion of the door when the door is closed.

22. An operator cab in accordance with claim 21, wherein at least one of said plurality of pairs of strikers is mounted for engaging each other at a front edge portion of the door when the door is fully opened, and at least one other pair of said plurality of pairs of strikers is mounted for engaging each other at a rear edge portion of the door when the door is fully opened.

23. An operator cab in accordance with claim 20, wherein at least one of said plurality of pairs of strikers is mounted for engaging each other at a front edge portion of the door when the door is fully opened, and at least one other pair of said plurality of pairs of strikers is mounted for engaging each other at a rear edge portion of the door when the door is fully opened.

* * * * *